(Model.)
2 Sheets—Sheet 1.
W. J. LANE.
Harrow.
No. 238,128.    Patented Feb. 22, 1881.
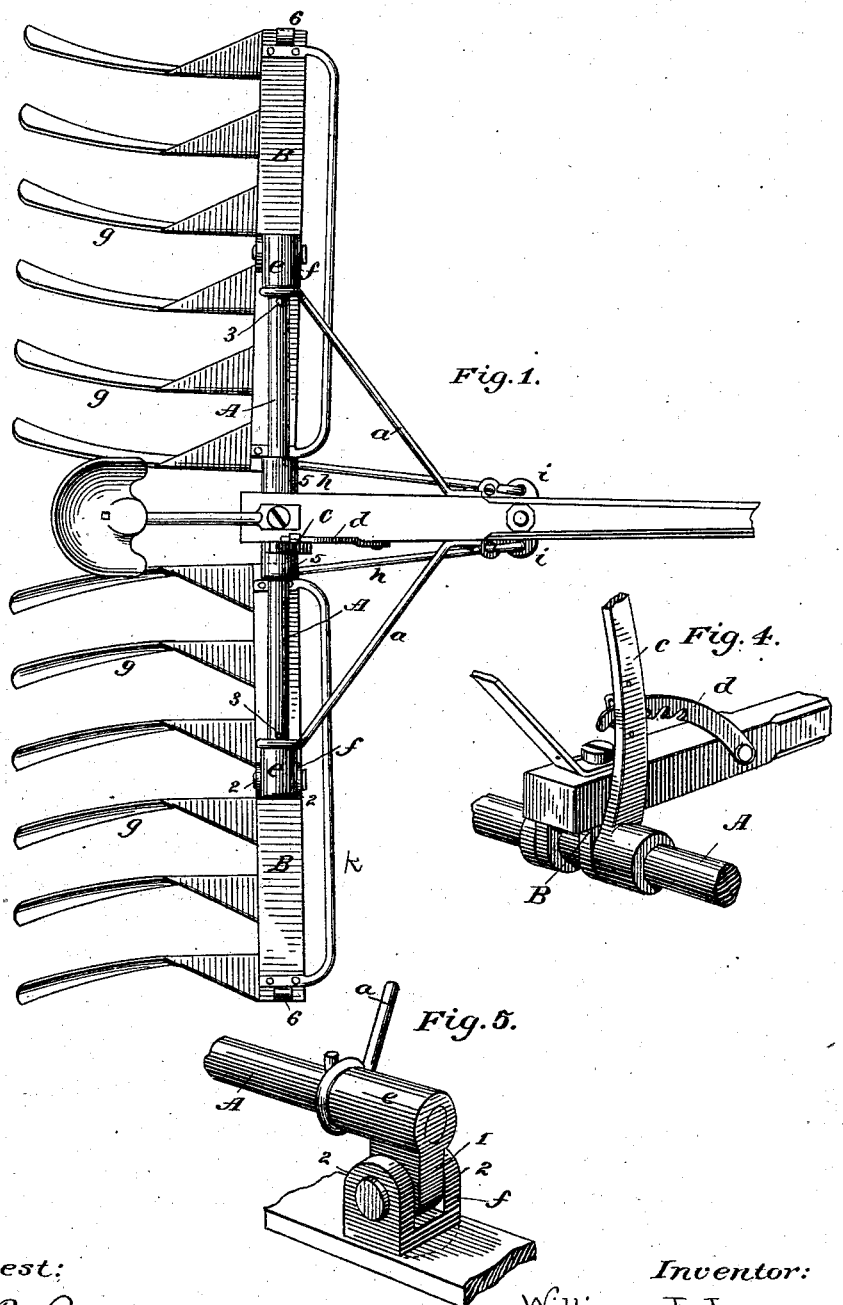
Attest:
R. F. Barnes.
Warren Seely
Inventor:
William J. Lane
by Ellis Spear
Attorney (Model.)
2 Sheets—Sheet 2.
W. J. LANE.
Harrow.
No. 238,128.  Patented Feb. 22, 1881.
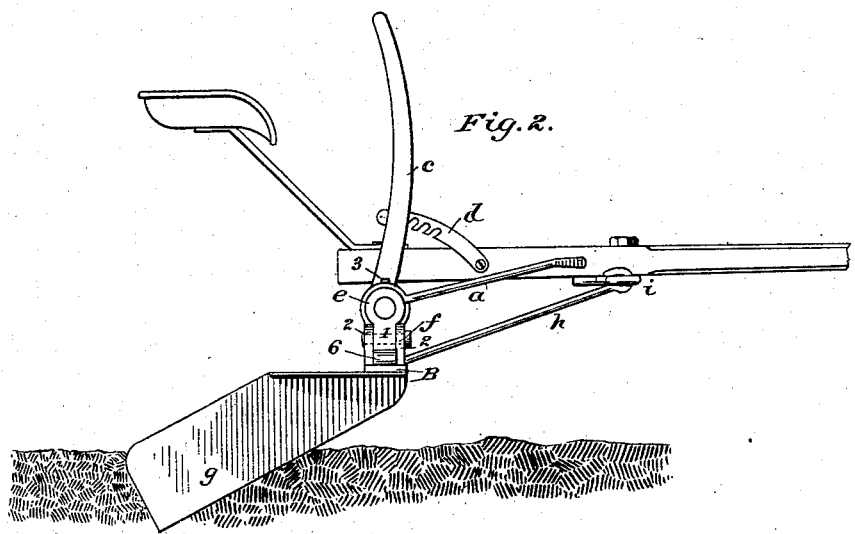
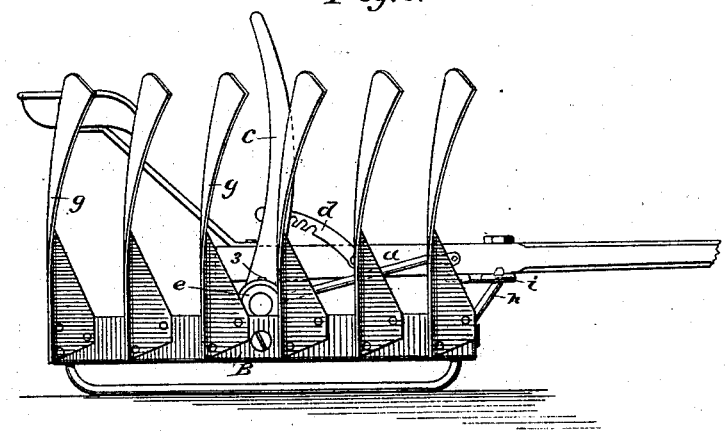
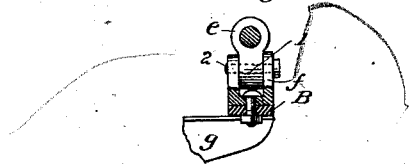
Attest:
R. F. Barnes.
Warren Seely
Inventor:
William J. Lane
by Ellis Spear
Attorney.

UNITED STATES PATENT OFFICE.

WILLIAM J. LANE, OF MILLBROOK, NEW YORK.

HARROW.

SPECIFICATION forming part of Letters Patent No. 238,128, dated February 22, 1881.

Application filed November 10, 1880. (Model.)

*To all whom it may concern:*

Be it known that I, WILLIAM J. LANE, of Millbrook, in the county of Dutchess and State of New York, have invented a new and useful Improvement in Harrows; and I do hereby declare that the following is a full, clear, and exact description of the same.

My invention relates to harrows of that class in which the teeth or blades which directly operate upon the soil are fixed to swiveled gang-bars made adjustable to the line of draft.

The invention consists in so swiveling these adjustable gang-bars that they may be turned parallel with the line of draft with the blades or shares uppermost, for the purpose of moving the implement from place to place; and it also consists in certain details of construction whereby the implement is greatly simplified, and all these details are hereinafter fully set forth.

In the drawings, Figure 1 is a plan view, Fig. 2 a side view, Fig. 3 an end view, of the harrow reversed; Fig. 4, a separate view of the shaft and its bearings, and Fig. 5 a separate view of the swivel-joint. Fig. 6 is a sectional view of the pivot-block, showing its connection with the gang-bar.

The pole of this apparatus is attached directly to the transverse head A, and is braced thereon by rods $a$ $a$, the rear ends of which embrace the head, so as to permit it to turn freely therein. The rear end of the pole is connected by means of a block, $b$, through ears in the lower part of which the head is passed. It is held centrally upon the head by rings fixed thereon upon each side of the block, to one of which is attached a handle or lever, $c$, adapted to rock the head, for a purpose hereinafter explained. A toothed rack-segment, $d$, is pivoted upon the pole and serves to support the lever at different heights. A seat for the driver, of ordinary construction, is attached to the rear of the pole, as clearly shown in the drawings.

Upon the outer ends of the head are fixed or formed blocks $e$ $e$, having ears 1 1, which are pivoted between ears 2 2 of blocks $ff$, so that the blocks $ff$ may swing laterally in or out upon the ears 1 1. The gang-bars B B are pivoted centrally upon these blocks $ff$, so that when the blocks hang vertically the gang-bars may swing freely in a horizontal plane. Connection of the gang-bars with the head is substantially a gimbal-joint connection. The bracing-rods are held in place between the blocks $e$ $e$ and pins 3 3.

To the gang-bars B B are fixed blades or shares $g$ $g$, made of elastic sheet metal and slightly curved laterally. The lower edge is inclined, being highest at the part next the bars. The teeth are formed for connection with the head by bending diagonally the upper and forward part substantially at right angle to the other part of the blade, and are attached to the bars by means of bolts or rivets passing through these bent diagonal flanges. These flanges also serve to brace or stiffen the forward part of the blades, leaving the greater part of the flexibility in the rear ends. The gang-bars are held in position for work by means of stay-rods $h$ $h$, which are hooked at their forward ends into ears $i$ $i$ on the pole, and at their rear ends they are hooked in holes 5 5 in the inner ends of the gang-bars. A second set of ears is provided in order to give some inclination to the gang-bars and set them at a slight angle to the head. Manifestly the gang-bars may be swung around upon the blocks $ff$, so as to bring them in line parallel with the line of draft, and in this position they may be turned up to bring the blades uppermost. They may be held in this position by the stay-rods $h$ $h$, which are fitted to hook into ears 6 6 in the outer and forward ends of the gang-bars. The gang-bars are thus held in a position adapted for moving from place to place.

I have provided on the gang-bars runners $k$ $k$, adapted to bear upon the surface of the ground and support the apparatus while in motion thereon.

The position of the apparatus when adapted for transportation is shown in Fig. 3.

When adapted to be worked the gang-bars are locked either parallel with the head or slightly inclined thereto, the increased inclination of the blades or shares being to adapt it to different kinds of work. Further variations of the movement and position are effected by means of the lever $c$, which rocks the head and thereby depresses the rear ends of the blades. The object of this is to give increased penetration of the soil, wherever that may be found desirable.

The swiveling of the gang-bars to move in vertical plane serves the double purpose of permitting these parts to adjust themselves to any inequalities of the soil, and also of allowing them to be turned up in the manner described, for movement of the implement from place to place.

The action of the blades and the effect of the adjustment in a horizontal plane or of depression of the blades will be understood by those skilled in the art.

Having thus described my invention, what I claim as my invention is—

1. The combination of the head A with the gang-bars B, swiveled so as to move in a horizontal plane to a position parallel to the line of draft, and then in a vertical plane, and vice versa.

2. The combination of the swiveled gang-bars, the runners $k$ $k$, and suitable locking devices, substantially as described.

3. The combination of the swiveled gang-bars, the head A, and the stay-rods $h$, adapted to lock the bars either in a position parallel, or substantially parallel, to the head, or at right angles thereto, as described.

In testimony whereof I have signed my name to this specification in the presence of two subscribing witnesses.

WILLIAM J. LANE.

Witnesses:
C. A. NEALE,
FRANK MIDDLETON.